US012797816B2

(12) United States Patent
Sakaguchi et al.

(10) Patent No.: US 12,797,816 B2
(45) Date of Patent: Nov. 17, 2026

(54) AMMONIA DECOMPOSITION SYSTEM

(71) Applicant: MITSUBISHI HEAVY INDUSTRIES, LTD., Tokyo (JP)

(72) Inventors: Masakazu Sakaguchi, Kanagawa (JP); Shinya Tachibana, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 745 days.

(21) Appl. No.: 18/271,774

(22) PCT Filed: Dec. 7, 2021

(86) PCT No.: PCT/JP2021/044815
§ 371 (c)(1),
(2) Date: Jul. 11, 2023

(87) PCT Pub. No.: WO2022/153720
PCT Pub. Date: Jul. 21, 2022

(65) Prior Publication Data

US 2024/0058780 A1 Feb. 22, 2024

(30) Foreign Application Priority Data

Jan. 14, 2021 (JP) ................................ 2021-004399

(51) Int. Cl.
*C01B 3/047* (2026.01)
*B01J 8/02* (2006.01)
*B01J 8/06* (2006.01)

(52) U.S. Cl.
CPC ........... *B01J 8/0278* (2013.01); *B01J 8/0285* (2013.01); *B01J 8/065* (2013.01); *B01J 8/067* (2013.01);
(Continued)

(58) Field of Classification Search
CPC . B01J 8/0278; B01J 8/0285; B01J 8/06; B01J 8/062; B01J 8/065; B01J 8/067;
(Continued)

(56) References Cited

U.S. PATENT DOCUMENTS

2002/0028171 A1* 3/2002 Goetsch ................ B01J 12/007 429/513
2004/0096370 A1 5/2004 Blanchard
(Continued)

FOREIGN PATENT DOCUMENTS

CN 112050202 A 12/2020
JP 2016-188721 A 11/2016
(Continued)

OTHER PUBLICATIONS

Machine Translation of JP 2016-188721 (Year: 2016).*
J.R. Davis, ASM Speciality Handbook, Heat-Resistant Materials, ASM International, pp. 169-172 (1997) (8 pages).
Extended European Search Report issued in counterpart European Application No. 21919609.4, dated Oct. 22, 2024 (8 pages).
(Continued)

*Primary Examiner* — Lessanework Seifu
(74) *Attorney, Agent, or Firm* — Osha Bergman Watanabe & Burton LLP

(57) ABSTRACT

An ammonia decomposition system includes: a reactor internally divided into a first chamber supplied with a raw material containing ammonia, and a second chamber located downstream of the first chamber in a direction in which the raw material flows; a catalyst containing part disposed in the reactor, having one end communicating with the first chamber and another end communicating with the second chamber, and extending into the second chamber; a catalyst for a decomposition reaction disposed inside the catalyst containing part, the decomposition reaction being a reaction where the raw material is decomposed into hydrogen and nitrogen; a diluent gas supply line for supplying a diluent gas having a lower ammonia concentration than the raw material, such that the diluent gas is mixed with the raw material before the
(Continued)

raw material flows into the catalyst; and an ammonia combustor for burning part of the ammonia.

5 Claims, 3 Drawing Sheets

(52) U.S. Cl.
CPC ............. *C01B 3/047* (2013.01); *B01J 8/0242* (2013.01); *B01J 2208/00309* (2013.01); *B01J 2208/00504* (2013.01); *B01J 2208/0053* (2013.01)

(58) Field of Classification Search
CPC ...... B01J 2208/00504; B01J 2208/0053; B01J 2208/00309
See application file for complete search history.

(56) References Cited

U.S. PATENT DOCUMENTS

| | | | |
|---|---|---|---|
| 2008/0093583 A1* | 4/2008 | van den Oosterkamp ................. | C01B 3/48 252/373 |
| 2015/0217278 A1 | 8/2015 | Hosono et al. | |
| 2016/0340182 A1 | 11/2016 | Hosono et al. | |

FOREIGN PATENT DOCUMENTS

| | | |
|---|---|---|
| JP | 2018-096616 A | 6/2018 |
| JP | 2019-167265 A | 10/2019 |
| JP | 2019-189467 A | 10/2019 |
| WO | 2014-045780 A1 | 3/2014 |

OTHER PUBLICATIONS

Written Opinion in corresponding Singapore Application No. 11202305070T, dated May 21, 2024 (6 pages).

* cited by examiner

AMMONIA DECOMPOSITION SYSTEM

TECHNICAL FIELD

The present disclosure relates to an ammonia decomposition system.

This application claims the priority of Japanese Patent Application No. 2021-004399 filed on Jan. 14, 2021, the content of which is incorporated herein by reference.

BACKGROUND

Patent Document 1 describes an ammonia decomposition system for decomposing ammonia into hydrogen and nitrogen by externally heating a catalyst layer while allowing ammonia to pass through.

CITATION LIST

Patent Literature

Patent Document 1: JP2019-167265A

SUMMARY

Technical Problem

However, under an environment with a high concentration of ammonia, such as when a raw material of 100% ammonia is used, ammonia and an iron-based material react and the iron-based material is nitrated at 500° C. to 600° C. which is a temperature where ammonia is decomposed, decreasing a mechanical strength. Then, for example, if a tube filled with a catalyst is made of the iron-based material, the mechanical strength of the tube is decreased, which may lead to breakage of the tube.

In view of the above, an object of at least one embodiment of the present disclosure is to provide an ammonia decomposition system capable of suppressing nitridation of a material for a reactor where ammonia is decomposed.

Solution to Problem

In order to achieve the above object, an ammonia decomposition system according to the present disclosure, includes: a reactor filled with a catalyst for a decomposition reaction where ammonia which is a raw material is decomposed into hydrogen and nitrogen; a diluent gas supply line for supplying a diluent gas having a lower ammonia concentration than the raw material, such that the diluent gas is mixed with the raw material before the raw material flows into the catalyst; and an ammonia combustor for burning part of the ammonia. The reactor includes a catalyst containing part for containing the catalyst. The reactor is internally divided into a first chamber supplied with the raw material, and a second chamber located downstream of the first chamber in a direction in which the raw material flows. The catalyst containing part is disposed so as to communicate with each of the first chamber and the second chamber and to extend in the second chamber. An outflow gas line through which a crude cracked gas produced from the raw material by the decomposition reaction flows after flowing out from the reactor as an outflow gas communicates with the second chamber upstream of a communication portion where the catalyst containing part communicates with the second chamber, and a combustion gas from the ammonia combustor is supplied to the second chamber.

Advantageous Effects

With an ammonia decomposition system of the present disclosure, since an ammonia concentration in a reactor is decreased by a diluent gas, it is possible to suppress nitridation of a material constituting the reactor where ammonia is decomposed.

DETAILED DESCRIPTION

Hereinafter, an ammonia decomposition system according to embodiments of the present disclosure will be described with reference to the drawings. The embodiments each indicate one aspect of the present disclosure, do not intend to limit the disclosure, and can optionally be modified within a scope of a technical idea of the present disclosure.

<Configuration of Ammonia Decomposition System According to Embodiment 1 of Present Disclosure>

Figure 1:
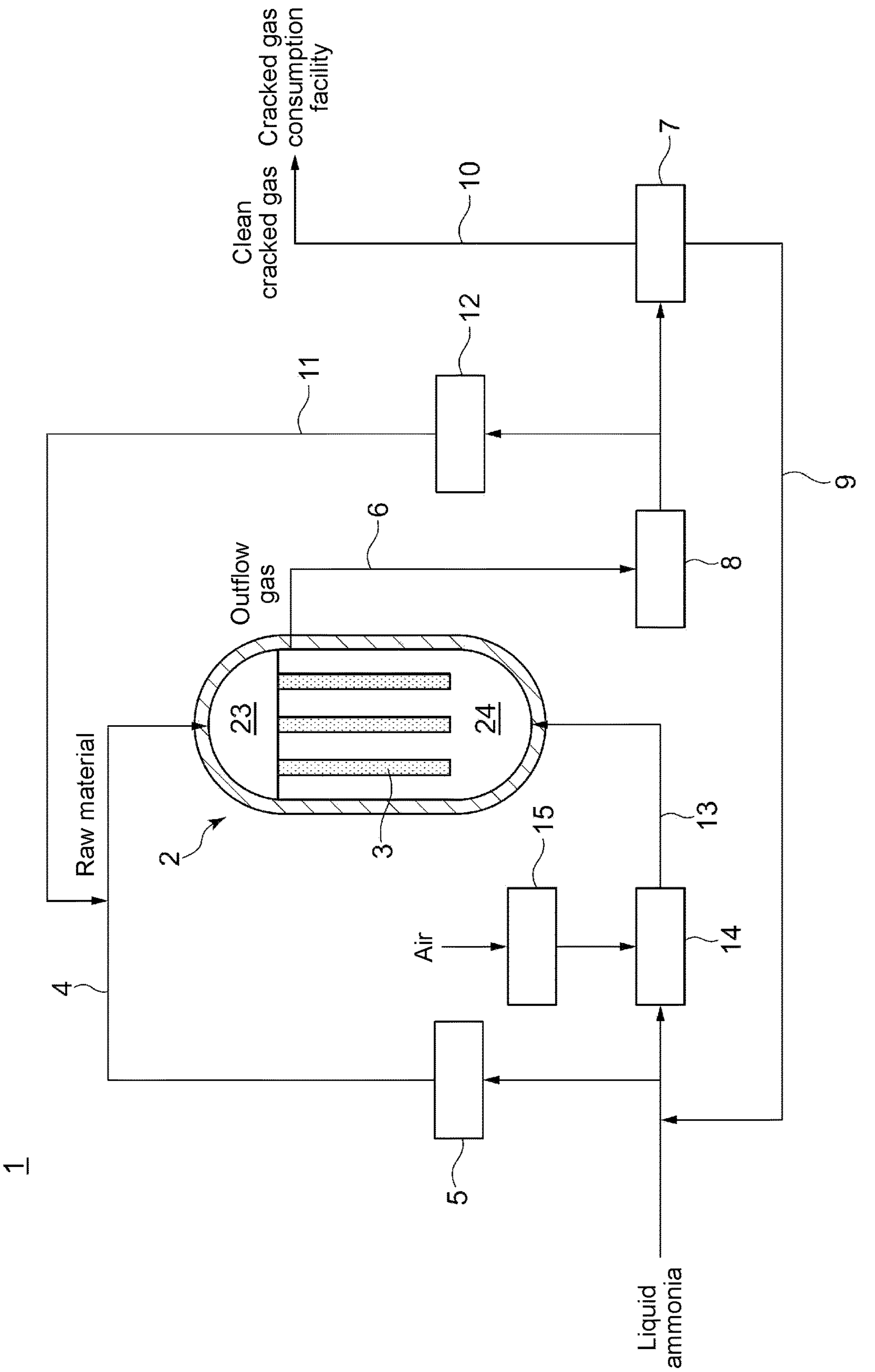
FIG. 1 is a configuration diagram of an ammonia decomposition system according to Embodiment 1 of the present disclosure.

As shown in FIG. 1, an ammonia decomposition system 1 according to Embodiment 1 of the present disclosure is an apparatus for decomposing ammonia, which is a raw material, into hydrogen and nitrogen by a reaction represented by the following reaction formula (1). The ammonia decomposition system 1 includes a reactor 2 filled with a catalyst 3 for the ammonia decomposition reaction represented by the reaction formula (1).

$$2NH_3 \rightarrow N_2 + 3H_2 \quad (1)$$

The reactor 2 is connected to a raw material supply line 4 for supplying the raw material to the reactor. The raw material supply line 4 is provided with an evaporator 5 for evaporating liquid ammonia supplied from a storage facility (not shown) for storing liquid ammonia into gaseous ammonia. Further, the reactor 2 is connected to one end of an outflow gas line 6 through which an outflow gas having flowed out from the reactor 2 flows. The outflow gas contains nitrogen, hydrogen, and unreacted ammonia according to the reaction formula (1).

Another end of the outflow gas line 6 is connected to an ammonia recovery device 7. The configuration of the ammonia recovery device 7 is not particularly limited, and may be, for example, a water scrubber, a pressure swing adsorption (PSA) device, or the like. The outflow gas line 6 is provided with a cooler 8 for cooling the outflow gas, upstream of the ammonia recovery device 7. The cooler 8 may be, for example, a heat exchanger for exchanging heat between the outflow gas and liquid ammonia before flowing into the evaporator 5. With this configuration, the outflow gas is cooled and the temperature of the liquid ammonia is raised, making it possible to reduce energy for raising the temperature of the liquid ammonia in the evaporator 5.

A recovered ammonia line 9 is provided in order to return the liquid ammonia recovered in the ammonia recovery device 7 to the raw material supply line 4 upstream of the evaporator 5. The ammonia recovery device 7 is connected to one end of a clean cracked gas line 10 for supplying a clean cracked gas produced by removing ammonia from the outflow gas in the ammonia recovery device 7 to a cracked gas consumption facility such as a hydrogen station. An outflow gas recycle line 11, which is connected at one end to the outflow gas line 6 and is connected at another end to the raw material supply line 4 is provided between the cooler 8 and the ammonia recovery device 7. The outflow gas recycle line 11 is provided with a compressor 12.

Figure 2:
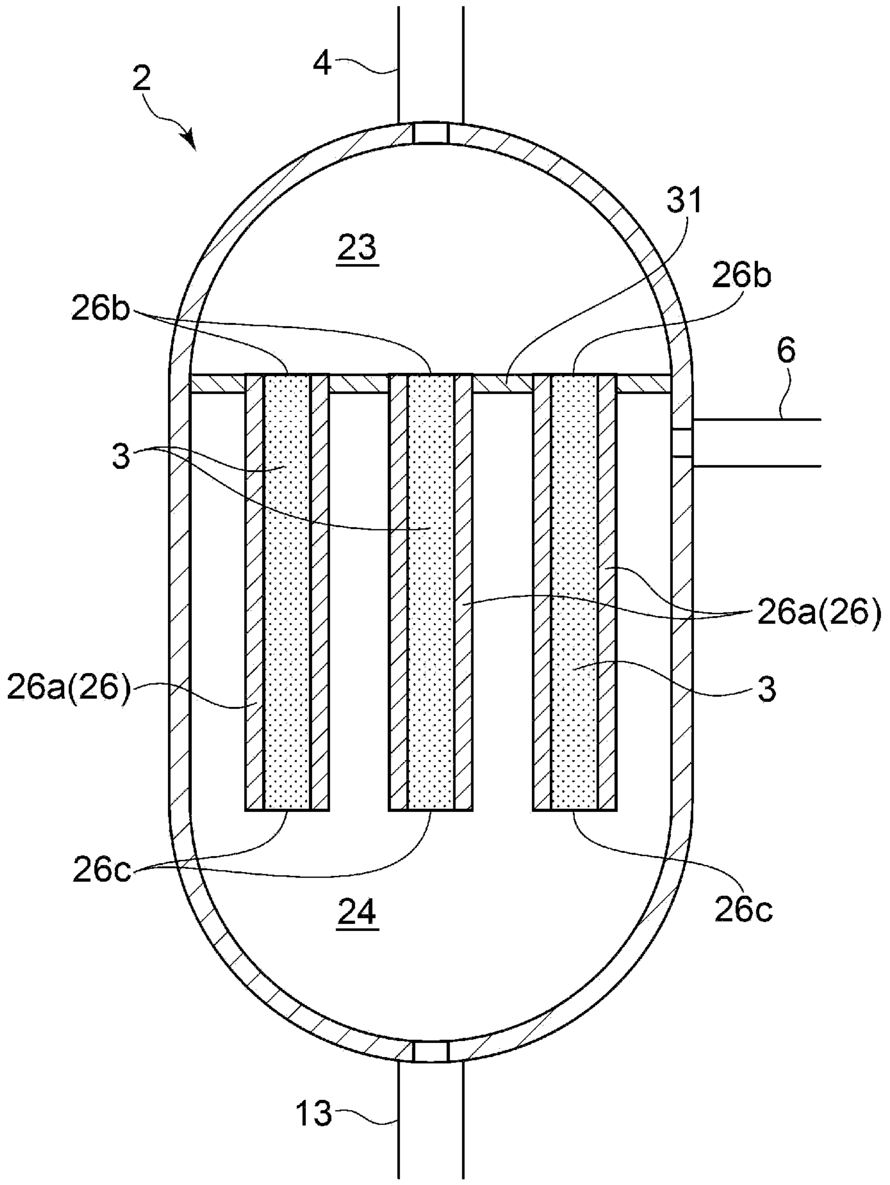
FIG. 2 is a configuration diagram of a reactor for the ammonia decomposition system according to Embodiment 1 of the present disclosure.

As shown in FIG. 2, the reactor 2 is internally divided by a partition member 31 into a first chamber 23, and a second chamber 24 located downstream of the first chamber 23 in a direction in which the raw material flows in the reactor 2. The raw material supply line 4 communicates with the first chamber 23, and the outflow gas line 6 communicates with the second chamber 24. In the second chamber 24, a plurality of catalyst containing parts 26 including tubular containing tubes **26*a* are each disposed so as to be fixed to the partition member 31 on one end 26*b* side and to extend from the one end 26*b* side toward another end 26*c* side in the second chamber 24. Each of the containing tubes 26*a* where the catalyst 3 is contained communicates with the first chamber 23 on the one end 26*b* side and communicates with the second chamber 24 on the another end 26*c* side. The outflow gas line 6 communicates with the second chamber 24 upstream of the another end 26*c* which is a communication portion where each containing tube 26*a* communicates with the second chamber 24**.

An ammonia branch line 13 branches off from the raw material supply line 4 upstream of the evaporator 5, and the ammonia branch line 13 communicates with the second chamber 24 of the reactor 2. The ammonia branch line 13 is provided with an ammonia combustor 14 for burning ammonia, and the ammonia combustor 14 communicates with a compressor 15 for supplying air to the ammonia combustor 14.

<Operation of Ammonia Decomposition System According to Embodiment 1 of Present Disclosure>

Next, an operation of the ammonia decomposition system 1 according to Embodiment 1 of present disclosure will be described with reference to FIGS. 1 and 2. Part of liquid ammonia flowing through the raw material supply line 4 flows into the ammonia branch line 13 and the rest of the liquid ammonia flows into the evaporator 5. After the liquid ammonia having flowed into the evaporator 5 evaporates into ammonia gas, the liquid ammonia is mixed with the outflow gas having supplied to the raw material supply line 4 via the outflow gas recycle line 11 and flows into the first chamber 23 of the reactor 2 as a mixed gas. The mixed gas having flowed into the first chamber 23 flows into the containing tube **26*a*, flows in the containing tube 26*a*, and flows out from the another end 26*c* of the containing tube 26*a* to the second chamber 24** as a crude cracked gas.

On the other hand, the liquid ammonia having flowed into the ammonia branch line 13 is burned in the ammonia combustor 14 by the air supplied from the compressor 15 to become a high-temperature combustion gas containing nitrogen and water as principal components, and flows into the second chamber 24 of the reactor 2. The combustion gas having flowed into the second chamber 24 moves toward the first chamber 23 side together with the crude cracked gas having flowed out from the another end **26*c* of the containing tube 26*a* to the second chamber 24. Herein, a combustion condition of ammonia in the ammonia combustor 14** is preferably adjusted such that the temperature of the mixture of the combustion gas and the crude cracked gas is 500° C. to 700° C.

When the combustion gas and the crude cracked gas move in the second chamber 24 toward the first chamber 23 side, the catalyst 3 and the mixed gas are heated. At this time, a flow direction of the combustion gas and the crude cracked gas and a flow direction of the mixed gas in each containing tube **26*a* are in a counterflow relationship, resulting in high heating efficiency of the mixed gas. At least part of ammonia in the mixed gas having flowed into the containing tube 26*a* is decomposed into hydrogen and nitrogen by the ammonia decomposition reaction represented by the reaction formula (1), which is caused by a catalytic action of the catalyst 3, and flows out from each catalyst containing part 26 to the second chamber 24 as the crude cracked gas. The crude cracked gas and the combustion gas having heated the catalyst 3 flow out from the second chamber 24 as the outflow gas and flows through the outflow gas line 6**.

After the outflow gas flowing through the outflow gas line 6 is cooled in the cooler 8, part of the outflow gas flows into the outflow gas recycle line 11 and the rest of the outflow gas flows into the ammonia recovery device 7. In the ammonia recovery device 7, ammonia is recovered from the outflow gas, the clean cracked gas containing hydrogen, nitrogen, traces of unrecovered ammonia, and a small amount of water if the ammonia recovery device 7 is a water scrubber is supplied to the cracked gas consumption facility via the clean cracked gas line 10, and the recovered ammonia is supplied to the raw material supply line 4 upstream of the evaporator 5 via the recovered ammonia line 9.

The outflow gas having flowed into the outflow gas recycle line 11 is pressurized by the compressor 12 and flows into the raw material supply line 4. In the raw material supply line 4, the ammonia gas and the outflow gas are mixed in the upstream space 42, and if the ammonia gas is 100% ammonia, since the outflow gas contains hydrogen and nitrogen in addition to ammonia, the ammonia concentration of the latter is lower than the ammonia concentration of the former, resulting in the ammonia concentration in the mixed gas of the ammonia gas and the outflow gas being lower than the ammonia concentration of the ammonia gas supplied as the raw material. That is, the outflow gas flowing into the raw material supply line 4 via the outflow gas recycle line 11 functions as a diluent gas for diluting the ammonia gas flowing into the first chamber 23.

In general, the higher the ammonia concentration and the higher the temperature, the more easily a nitridation reaction by ammonia occurs, and in the ammonia decomposition system 1 according to Embodiment 1 of the present disclosure, since the ammonia concentration in the reactor 2 is decreased by the outflow gas supplied via the outflow gas recycle line 11, it is possible to suppress nitridation of the material constituting the reactor 2. Moreover, since the catalyst 3 is heated with the heat of the combustion gas and the crude cracked gas produced by causing the mixed gas to pass through the catalyst 3, it is possible to render a device for heating the catalyst 3 unnecessary.

Modified Example of Ammonia Decomposition System According to Embodiment 1 of Present Disclosure In Embodiment 1, the outflow gas before flowing into the ammonia recovery device 7 is used as the diluent gas. However, the present disclosure is not limited to this form.

The clean cracked gas having flowed out from the ammonia recovery device 7 may be used as the diluent gas. The clean cracked gas is also a gas obtained by recovering ammonia from the outflow gas, and thus can be said to be the outflow gas having flowed out from the reactor 2. Further, in Embodiment 1, the liquid ammonia with 100% concentration stored in a storage facility (not shown) is evaporated into gaseous ammonia in the evaporator 5. However, the present disclosure is not limited to supplying the liquid ammonia with 100% concentration to the evaporator 5, but a principal component mixed with a small amount of a mixture may supply a liquid containing ammonia to the evaporator 5.

In Embodiment 1, in the ammonia combustor 14, only part of the liquid ammonia flowing through the raw material supply line 4 is burned. However, the present disclosure is not limited to this form. The ammonia decomposition system may be configured such that part of the liquid ammonia and part of the outflow gas (which may be the clean cracked gas) having flowed out from the reactor 2 are burned in the ammonia combustor 14. Since ammonia is generally difficult to burn, even if only ammonia is burned in the ammonia combustor 14, it may be difficult to obtain a combustion gas having a desired temperature. By contrast, with the above configuration, since the outflow gas contains easily combustible hydrogen, ammonia is easily burned in the ammonia combustor 14, making it easier to obtain the combustion gas having the desired temperature.

In Embodiment 1, the outflow gas recycle line 11 is connected to the raw material supply line 4. However, the present disclosure is not limited this form. The outflow gas recycle line 11 may be connected to the reactor 2 so as to communicate with the first chamber 23.

In Embodiment 1, the outflow gas recycle line 11 may be connected to the raw material supply line 4 or may be connected to the reactor 2 so as to communicate with the first chamber 23, but the former configuration is preferred for the following reasons. In the latter configuration, when the ammonia gas flows into the first chamber 23 from the raw material supply line 4, part of the ammonia gas is blown onto the partition member 31 or the one end 26*b* of the containing tube 26*a*, which may nitride the partition member 31 or the containing tube 26*a*. By contrast, in the former configuration, since ammonia flows into the first chamber 23 in a state where ammonia is diluted in advance in the raw material supply line 4, the risk of nitridation can be reduced compared to the latter configuration.

Figure 3:
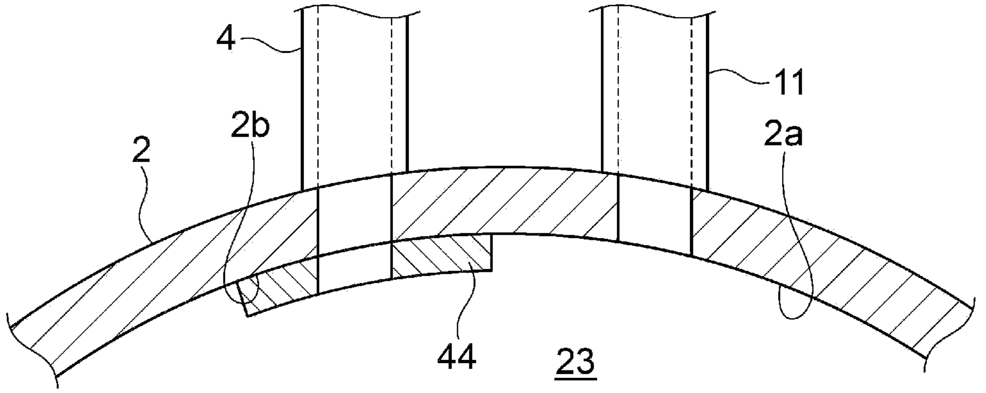
FIG. 3 is a partial cross-sectional view showing a modified example of the reactor for the ammonia decomposition system according to Embodiment 1 of the present disclosure.

In Embodiment 1, the inner surface 2*a* of the reactor 2 may be covered with a refractory material such as a brick, a refractory brick, or refractory cement. However, in Embodiment 1, nitridation by ammonia may occur in the catalyst containing part 26, and thus covering the entire inner surface 2*a* of the reactor 2 with the refractory material results in an unnecessary cost increase from the viewpoint of the technical effect. However, as shown in FIG. 3, if the raw material supply line 4 and the outflow gas recycle line 11 are connected to the reactor 2 so as to communicate with the first chamber 23, a connection portion 2*b*, of the inner surface 2*a* of the reactor 2, of the reactor 2 with the raw material supply line 4 may be nitrided depending on an internal temperature of the first chamber 23 in the reactor 2. By contrast, if the inner surface 2*a* is partially covered with the refractory material 44 such that the connection portion 2*b* is surrounded, an increase in temperature of the connection portion 2*b* is suppressed by the refractory material 44, making it possible to reduce, without requiring undue cost, the risk of nitridation of the connection portion 2*b*.

In Embodiment 1, the diluent gas is the outflow gas (the crude cracked gas or the clean cracked gas) having flowed out from the reactor 2. However, the diluent gas is not limited to the outflow gas. A diluent gas different from the outflow gas may be prepared separately, and a diluent gas supply line may be provided through which a supply source of the diluent gas communicates with the reactor 2 or the raw material supply line 4. If the outflow gas is used as the diluent gas, the outflow gas recycle line 11 constitutes the diluent gas supply line.

Nitrogen gas and hydrogen gas can be used as the diluent gas other than the outflow gas, and hydrogen gas from a hydrogen pipeline may be used as the hydrogen gas. In addition, it is possible to use a gas which contains hydrogen produced in another hydrogen production process, such as (1) gas which contains hydrogen obtained by steam reforming methane or methanol, (2) coal gasification gas, (3) blast furnace gas, (4) coke oven gas, (5) gas obtained by increasing hydrogen through a water gas shift reaction with respect to the gases of the above (1) to (4), (6) gas obtained by removing carbon dioxide from the gas of the above (5), (7) gas obtained by removing moisture from the gas of the above (6), (8) gas which contains hydrogen obtained by catalytic reforming of naphtha, (9) gas which contains hydrogen obtained by electrolysis of water, or (10) gas which contains hydrogen obtained by a thermal decomposition reaction of methane. In further addition, it is possible to use gas which contains hydrogen obtained in an external ammonia decomposition process, such as gas which contains hydrogen obtained from an external plant for performing thermal decomposition on ammonia or gas which contains hydrogen obtained from an external plant for decomposing ammonia by an autothermal method.

In the ammonia decomposition reaction in Embodiment 1, since only hydrogen and nitrogen are produced, no carbon dioxide is emitted. Further, in the ammonia combustor 14 of Embodiment 1 and the combustor 51 of Embodiment 4, since ammonia and hydrogen are burned in the combustor 51 of Embodiment 2, no carbon dioxide is emitted. As described above, as long as the outflow gas is used as the diluent gas without using fossil fuel in Embodiment 1, the raw material of the ammonia decomposition system 1 is completed with only ammonia and no carbon dioxide is emitted, and thus the ammonia decomposition system 1 is a preferred form as a carbon-free process.

The contents described in the above embodiments would be understood as follows, for instance.

[1] An ammonia decomposition system according to one aspect, includes: a reactor (2) filled with a catalyst (3) for a decomposition reaction where ammonia which is a raw material is decomposed into hydrogen and nitrogen; a diluent gas supply line (11) for supplying a diluent gas having a lower ammonia concentration than the raw material, such that the diluent gas is mixed with the raw material before the raw material flows into the catalyst (3); and an ammonia combustor (14) for burning part of the ammonia. The reactor (2) includes a catalyst containing part (26) for containing the catalyst (3). The reactor (2) is internally divided into a first chamber (23) and a second chamber (24) located downstream of the first chamber (23) in a direction in which the raw material flows. The catalyst containing part (26) is disposed so as to communicate with each of the first chamber (23) and the second chamber (24) and to extend in the second chamber (24). An outflow gas line (6) through which a crude cracked gas produced from the raw material by the decomposition reaction flows after flowing out from the reactor (2) as an outflow gas communicates with the second chamber (24) upstream of a communication portion (the another end 26*c* of the containing tube 26*a*) where the catalyst containing part (26) communicates with the second chamber (24), and a combustion gas from the ammonia combustor (14) is supplied to the second chamber (24).

With an ammonia decomposition system of the present disclosure, since an ammonia concentration in a reactor is decreased by a diluent gas, it is possible to suppress nitridation of a material constituting the reactor where ammonia is decomposed. Moreover, since the catalyst is heated with the heat of the combustion gas and the crude cracked gas produced by causing ammonia to pass through the catalyst, it is possible to render a device for heating the catalyst unnecessary.

[2] An ammonia decomposition system according to another aspect is the ammonia decomposition system of [1], wherein the diluent gas is part of an outflow gas having flowed out from the reactor (2).

With such configuration, an operating cost of the ammonia decomposition system can be reduced compared to the case where the diluent gas is prepared separately.

[3] An ammonia decomposition system according to still another aspect is the ammonia decomposition system of [1] or [2], wherein the ammonia decomposition system is configured such that part of the raw material and part of the outflow gas having flowed out from the reactor (2) are burned in the ammonia combustor (14).

Since ammonia is generally difficult to burn, even if only ammonia is burned in the ammonia combustor, it may be difficult to obtain a combustion gas having a desired temperature. By contrast, with the above configuration [3], since the outflow gas contains easily combustible hydrogen, ammonia is easily burned in the ammonia combustor, making it easier to obtain the combustion gas having the desired temperature. [4] An ammonia decomposition system according to still another aspect is the ammonia decomposition system of [1] to [3], including a raw material supply line (4) for supplying the raw material to the reactor (2). The raw material supply line (4) is connected to a downstream end of the diluent gas supply line (11).

With such configuration, since an ammonia concentration can be decreased before the raw material flows into the reactor, it is possible to further suppress nitridation of a material constituting the reactor where ammonia is decomposed.

[5] An ammonia decomposition system according to still another aspect is the ammonia decomposition system of [1] to [3], wherein the diluent gas supply line (11) has a downstream end connected to the reactor (2).

In a case where the diluent gas is raised in temperature while flowing through the diluent gas supply line, if the diluent gas is supplied to the raw material supply line, the heat causes ammonia and the material of the raw material supply line to react, which may nitride the material of the raw material supply line. By contrast, with the above configuration [5], since ammonia and the diluent gas flow separately into the reactor, it is possible to reduce the risk of nitridation the material of the raw material supply line.

[6] An ammonia decomposition system according to still another aspect is the ammonia decomposition system of [5], including a raw material supply line (4) for supplying the raw material to the reactor (2). The reactor (2) has an inner surface (2*a*) at least partially covered with a refractory material (44) such that a connection portion (2*b*) of the reactor (2) with the raw material supply line (4) is surrounded.

With the above configuration [5], although it is possible to reduce the risk of nitridation of the material of the raw material supply line, the connection portion of the reactor with the raw material supply line may be nitrided depending on the internal temperature of the reactor. By contrast, with the above configuration [6], an increase in temperature of the above-described connection portion is suppressed by the refractory material, making it possible to reduce the risk of nitridation of the above-described connection portion.

REFERENCE SIGNS LIST

1 Ammonia decomposition system
2 Reactor
2*a* Inner surface (of reactor)
2*b* Connection portion
3 Catalyst
4 Raw material supply line
6 Outflow gas line
11 Outflow gas recycle line (diluent gas supply line)
14 Ammonia combustor
23 First chamber
24 Second chamber
Third chamber
26 Catalyst containing part
26*a* Containing tube (catalyst containing part)
26*c* Another end (communication portion) (of containing tube)
41 Heater (temperature raising device)
44 Refractory material
51 Combustor (temperature raising device)

The invention claimed is:

1. An ammonia decomposition system, comprising:

a reactor internally divided into a first chamber supplied with a raw material containing ammonia, and a second chamber located downstream of the first chamber in a direction in which the raw material flows;

a catalyst containing part disposed in the reactor and extending into the second chamber, the catalyst containing part having one end communicating with the first chamber and another end communicating with the second chamber;

a catalyst for a decomposition reaction disposed inside the catalyst containing part, the decomposition reaction being a reaction where the raw material is decomposed into hydrogen and nitrogen;

a diluent gas supply line for supplying a diluent gas having a lower ammonia concentration than the raw material, such that the diluent gas is mixed with the raw material before the raw material flows into the catalyst; and an ammonia combustor for burning part of the ammonia, wherein an outflow gas line, through which an outflow gas flowing out from the reactor is discharged, communicates with the second chamber at a position closer to the one end than to the another end of the catalyst containing part in a direction in which the catalyst containing part extends, the outflow gas including a crude cracked gas produced from the raw material by the decomposition reaction, wherein combustion gas from the ammonia combustor is supplied to the second chamber, and wherein the diluent gas supply line is connected to the outflow gas line so as to recycle part of the outflow gas as the diluent gas.

2. The ammonia decomposition system according to claim 1, wherein the ammonia decomposition system is configured such that part of the raw material and part of the outflow gas having flowed out from the reactor are burned in the ammonia combustor.

3. The ammonia decomposition system according to claim 1, comprising:

a raw material supply line for supplying the raw material to the reactor, wherein the raw material supply line is connected to a downstream end of the diluent gas supply line.

4. The ammonia decomposition system according to claim 1, wherein the diluent gas supply line has a downstream end connected to the reactor.

5. The ammonia decomposition system according to claim 4, comprising:

a raw material supply line for supplying the raw material to the reactor, wherein an inner surface of the reactor is at least partially covered with a refractory material such that a connection portion of the reactor with the raw material supply line is surrounded by the refractory material.

* * * * *